Aug. 10, 1943.   S. DI RENZO   2,326,337
RADIO COMPASS DIRECTION FINDER
Filed Feb. 25, 1941
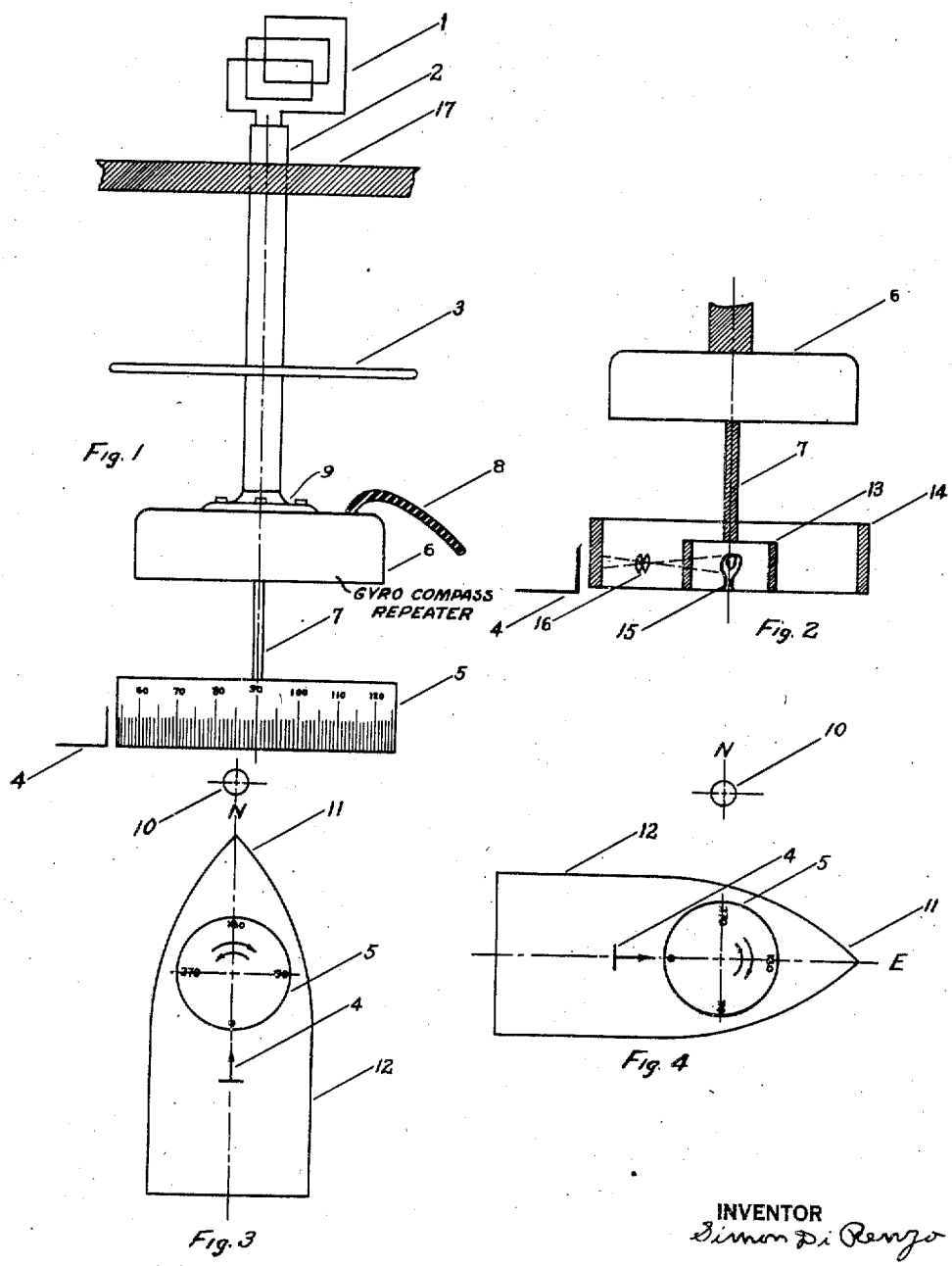
INVENTOR
Simon Di Renzo Patented Aug. 10, 1943

2,326,337

UNITED STATES PATENT OFFICE 2,326,337

RADIO COMPASS DIRECTION FINDER

Simon Di Renzo, Philadelphia, Pa.

Application February 25, 1941, Serial No. 380,418

5 Claims. (Cl. 250—11)

This invention relates to an improvement on radio compass direction finder apparatus; more specifically to the calibrated scale and control portions of such apparatus.

It is well known to those familiar with the military and naval use of radio direction finding equipment, that the speed with which bearings can be obtained is of paramount importance.

Radio direction finding equipment as at present constituted, is effective and accurate. However, there is one disadvantage, which if eliminated, would speed up considerably the process of taking radio bearings, and would also eliminate the necessity for applying corrections to readings obtained. This disadvantage is the necessity for using two radio-men or two men; one to take the radio bearing, the other to simultaneously read the gyro-repeater in the radio room or some other point. These two readings must then be added or subtracted to each other to obtain the true bearing. It can be readily seen that if each time the radio compass scale is read, the true reading would be automatically obtained, a valuable saving in time would result and valuable trained personnel would be made available for other duties.

It is the object of this invention to so improve the present radio compass equipment, that a single direct reading from the radio compass scale will give the true bearing of the station upon which it is being used, at any and all times, thus securing the advantages mentioned above.

The following specification forms a description of this invention so that persons skilled in the art can readily understand its operation.

Variations in combining the several elements are possible, without departing from the spirit of the invention, so that I desire to be limited only by the scope of the appended claims.

Fig. 1 shows a diagrammatic view of a radio compass control with my invention incorporated.

Fig. 2 is a variation of the invention showing the use of an inner transparent scale which is responsive to changes in the ship's head through the action of a gyro repeater, and whose calibrated divisions are projected onto an outer translucent scale placed concentrically around this inner scale. The projected calibration on the outer scale can be read through the translucent material.

Fig. 3 shows a diagram to illustrate the relative positions of the ship's head, the calibrated radio compass scale and pointer, and the direction of an unknown radio transmitter.

Fig. 4 shows the relative positions of ship's head, radio compass scale and pointer, and unknown radio transmitter position, when the ship's head has shifted from position shown in Fig. 3.

Similar numerals refer to similar elements throughout the several views.

Referring to Fig. 1, 1 is the loop antenna of the radio compass receiver, 2 is the rotatable shaft upon which it is mounted, 3 is the wheel or control which is used to rotate the antenna, 4 is the fixed index line or pointer, 5 is the radio compass scale, actuated by two independent means of rotation, capable of being simultaneously affected in direction or rapidity of rotation relative to the fixed index line, 6 is a modified gyro-repeater, adapted to mount or be attached rigidly to the rotatable shaft of the radio compass loop, 7 is the shaft which supports the scale 5 and which rotates this scale in accordance with changes in the ship's head.

This shaft is independent of the loop antenna shaft 2, and connects the scale 5 to the gyro repeater 6.

Note that this novel arrangement allows the scale 5 to be rotated by means of the wheel 3, only by turning the whole gyro-repeater mechanism 6; and that this same scale 5 is capable of being independently rotated in either direction by the shaft 7 of the gyro-repeater mechanism. The electrical cable 8 connects the gyro-repeater mechanism to the master gyro compass. Suitable means of connection is employed between this cable 8 and the gyro-repeater 6 which is rotated with the loop antenna shaft 2. Any one of several standard methods of connecting may be employed, such as brushes bearing on slip rings, or flexible wire coiled up in pigtails. For simplicity the cable 8 is shown directly connected to the gyro repeater 6.

The shaft 2 of the radio compass loop has a flange 9 upon its end, to which is attached the housing 6 enclosing the gyro repeater mechanism. This mechanism is not shown since this invention utilizes only the visible effects of the operation of the mechanism in combination with the visible and audible effects of the rotation of the radio compass loop 1, when the effects of each are combined automatically and simultaneously to obtain true radio compass bearings by direct reading of the scale 5.

The shaft 2 goes through the bulkhead or overhead 11 in an appropriate manner to obtain support for the radio compass direction finder and permit rotation of the loop antenna 1.

Referring to Figs. 3 and 4, the operation of this novel arrangement described in Fig. 1 is as follows: 10 represents an unknown radio transmitter, the ship 12 is equipped with radio compass direction finder incorporating the invention herein described. The ship 12 proceeds to take a radio compass bearing on the unknown radio transmitter 10. In order to describe the operation of the invention, the direction of the unknown radio transmitter 10 from the ship 12 is shown as north, which is 0° or 360° on the radio compass scale 5.

The position of the loop antenna of the radio compass direction finder and the position of the gyro-repeater actuated scale 5 in relation to the fixed index line or pointer 4 is such that when the ship's head 11 is pointed north, the gyro-repeater actuated scale 5, as read at the fixed index line 4, is 0° or 360°.

In obtaining radio compass bearings, when the "null" point, or the point of minimum sound is adjusted for, the plane of the loop antenna is at right angles to the line of the transmitting station whose bearing is being determined.

In the example shown in Fig. 3 this means that the plane of the loop antenna 1 is at right angles to the line of the unknown transmitter 10, or 0° or 360° as read on the scale 5 which is rotated simultaneously with the loop antenna 1.

Assuming, then, the conditions shown in Fig. 3, the ship's head 11 points north in the direction of the unknown radio transmitter 10. Therefore the gyro-repeater 6 actuates the radio compass scale 5 in step with the master gyro compass of the ship, until the point 0° or 360° of the radio compass scale 5 is aligned with the fixed index line 4.

At the same time that this scale 5 is being actuated by the gyro repeater 6 in conformity with the master gyro compass, the loop control wheel 3 is rotated (thereby also rotating the gyro repeater 6 and the scale 5) until the null point or point of minimum sound in the headphones is reached. In the example of Fig. 3 this will be 0° or 360° on the radio compass scale 5 as read at the fixed index line 4.

Thus, the gyro-repeater 6 actuates the radio compass scale 5 to conform with changes in the ship's head 11, and the radio compass loop control wheel 3 is turned so that the plane of the radio compass loop 1 is at right angles to the direction of the radio transmitter 10, thereby also turning the scale 5 and gyro repeater 6.

The result of these two independent motions, simultaneously applied to the scale 5 in the novel arrangement of the invention herein described, is the true bearing of the unknown radio transmitter 10 from the ship 12, read directly on the radio compass scale 5.

Referring to Fig. 4, the operation of the improved radio compass is considered when the unknown radio transmitter 10 still bears north from the ship 12, but the ship's head 11 is now pointing east. When this is the case, in the ordinary type of radio compass direction finder, the scale of the radio compass is turned the same number of degrees relative to the point 10, as the ship's head turns relative to this point.

In getting the true bearing of the radio transmitter 10 with the radio compass equipment in present day use, it is necessary to add the bearing of the ship's head 11 as read separately on the gyro-compass, in this case 90°, to the bearing of the radio transmitter 10, as read on the radio compass scale, in this case 270°.

The result of this computation is 360° or 0°, the true bearing of the radio transmitter 10 from the ship 12.

As contrasted to this procedure now necessary with present day radio compass equipment, the operation of my improved radio compass is considered.

When the ship's head 11, swings around to east as shown in Fig. 4, the radio compass scale 5 actuated by the gyro repeater mechanism 6, immediately follows the ships head automatically and assumes a position under the fixed index line 4 marked 90° which corresponds to the bearing of the ship's head 11. The radio compass loop control wheel 3 is rotated until the null point is reached (plane of loop antenna at right angles to the line of the transmitting station 10). Since the scale 5 reads 90° in conformity with the ship's head 11, when this same scale is turned by the radio compass control wheel 3 so that the radio compass loop antenna now is at right angles to the direction of the radio transmitter 10, this scale 5 will be rotated 90° in a counter-clockwise direction, bringing the point marked 0° or 360° on this scale 5 in alignment with the fixed index line 4.

This reading, obtained directly from the scale 5 of the improved radio compass herein described, is the true bearing of the unknown radio transmitter 10 from the ship 12.

Fig. 2 shows a view in section of one variation of the scale 5 and gyro repeater 6 of Fig. 1.

In this arrangement, use is made of an optical projection system, which projects the calibration lines and numerals of the inner scale 13 onto an outer translucent scale 14 by means of the light source 15 placed in the center of the inner transparent scale 13, and the lens system 16.

The inner scale 13 is actuated by the gyro repeater mechanism in the same manner as the radio compass scale 5 of Fig. 1. As this transparent scale 13 turns in response to the gyro repeater mechanism, the corresponding divisions and numerals are brought in optical alignment with the lens system 16, projecting a portion of the inner scale calibration 13 onto the translucent outer scale 14. The fixed index line 4 is used to read the outer scale 14.

The inner scale 13 and outer scale 14 are both rotatable with the radio compass shaft 2. In addition, the inner scale 13 is independently rotatable by the gyro repeater in response to changes in the ship's head.

The combination of both these independent rotations applied simultaneously, gives the true bearing of an unknown radio transmitter directly from the radio compass scale 14 which has upon it the optically projected calibration from the inner scale 13, making the operation of the device similar to the preferred embodiment shown in Fig. 1.

From the foregoing description of my invention for radio compass equipment it can be seen that several advantages would result from its use. These are:

First, it would eliminate the need for an additional man in the radio compass room who now is used to read the gyro-repeater at the same time another man reads the radio compass scale.

Second, the process of obtaining radio bearings on an unknown radio transmitter would be speeded up considerably, because the reading can be made directly from the radio compass scale without the need for calculation. This increase in speed is especially valuable in cases of emergency.

Third, the possibility of error is greatly reduced because the bearing is obtained directly from the radio compass scale and eliminates the necessity for computations in which errors might occur.

Fourth, the cost of incorporating my invention would be quite small since both the radio compass and the gyro repeater are at present separately used in getting radio bearings.

The biggest cost would be represented in the re-design of the present equipment and not in material or manufacture.

What I claim is:

1. In a radio direction finder for ships, a loop antenna, a vertically extending shaft arranged to support and rotate said loop antenna, a housing containing gyro compass repeater mechanism, said housing being directly and rigidly attached to said shaft; the vertical axes of said housing and said shaft being in alignment, so that said shaft and said housing rotate concentrically on a common vertical axis, a calibrated scale, a fixed index adjacent to said calibrated scale, a second vertical shaft; one end of said second shaft adapted to support and rotate said calibrated scale, the other end of said second shaft fitted into said gyro compass repeater mechanism to produce rotation of said calibrated scale independently of the rotation of said gyro compass repeater housing and said loop antenna, the vertical axis of said second shaft being in alignment with the vertical axis of said first shaft and with the vertical axis of said gyro compass repeater housing, so that said first shaft, said gyro compass repeater housing, said second shaft and said calibrated scale rotate concentrically on a common vertical axis, means to make audible the signals picked up by said loop antenna, means to effect rotation of said loop antenna to produce a minimum signal strength, the two independent and/or simultaneous rotations aplied to said calibrated scale by means of said first shaft and said second shaft resulting in a reading which is the algebraic sum of the bearing of the ship's head and the bearing of the transmitter whose direction is being found.

2. In a radio direction finder for ships, a loop antenna, a vertically extending shaft arranged to support and rotate said loop antenna, a housing containing gyro compass repeater mechanism, said housing being directly and rigidly attached to said shaft; the vertical axes of said loop antenna, said shaft, and said housing being in alignment, so that said loop antenna, said shaft and said housing rotate concentrically on a common vertical axis, a calibrated scale, a fixed index adjacent to said calibrated scale, a second vertical shaft; one end of said second shaft adapted to support and rotate said calibrated scale, the other end of said second shaft fitted into said gyro compass repeater mechanism to produce rotation of said calibrated scale independently of the rotation of said gyro compass repeater housing and said loop antenna, the vertical axis of said second shaft being in alignment with the vertical axes of said loop antenna, said first shaft and with the vertical axis of said gyro compass repeater housing, so that said loop antenna, said first shaft, said gyro compass repeater housing, said second shaft and said calibrated scale rotate concentrically on a common vertical axis, means to make audible the signals picked up by said loop antenna, means to effect rotation of said loop antenna to produce a minimum signal strength, the two independent and/or simultaneous rotations applied to said calibrated scale by means of said first shaft and said second shaft, resulting in a reading which is the algebraic sum of the bearing of the ship's head and the bearing of the transmitter whose direction is being determined.

3. In a radio compass direction finder for ships, a loop antenna, a vertically extending shaft adapted to support and rotate said loop antenna, means responsive to changes in direction or bearing of the ship's head mounted directly upon said shaft; the vertical axes of said loop antenna, said shaft and said means being in alignment, so that said loop antenna, said shaft and said means rotate concentrically on a common vertical axis, a calibrated scale, a fixed index adjacent to said calibrated scale, a second vertical shaft; one end of said second shaft adapted to support and rotate said calibrated scale; the other end of said second shaft fitted into and actuated by said means responsive to changes in direction or bearing of the ship's head, the vertical axis of said second shaft being in alignment with the vertical axes of said loop antenna, said first shaft and with the vertical axis of said means, so that said loop antenna, said first shaft, said means, said second shaft and said calibrated scale rotate concentrically on a common vertical axis, means to make audible the signals picked up by said loop antenna, means to effect rotation of said loop antenna to produce a minimum signal strength, the two independent and/or simultaneous rotations applied to said calibrated scale by means of said first shaft and said second shaft, resulting in a reading which is the algebraic sum of the bearing of the ship's head and the bearing of the transmitter whose direction is being determined.

4. In a mobile radio direction finder, a loop antenna, a vertically extending shaft adapted to supoort and rotate said loop antenna, means responsive to changes in direction or bearing of the mobile unit in which said radio direction finder is located, said means being directly and rigidly attached to said shaft; the vertical axes of said loop antenna, said shaft and said means being in alignment, so that said loop antenna, said means and said shaft rotate concentrically on a common vertical axis, a calibrated scale, a fixed index adjacent to said calibrated scale, a second vertical shaft; one end of said second shaft adapted to support and rotate said calibrated scale, the other end of said second shaft fitted into and actuated by said means responsive to changes in direction or bearing of the mobile unit in which said direction finder is located, the vertical axis of said second shaft being in alignment with the vertical axes of said loop antenna, said first shaft and with the vertical axis of said means, so that said loop antenna, said first shaft, said means, said second shaft and said calibrated scale rotate on a common vertical axis, and, in conjunction with suitable radio receiving apparatus, the two independent and/or simultaneous rotations applied to said calibrated scale by means of said first shaft and said second shaft, result in a reading which is the algebraic sum of the bearing of the mobile unit in which said radio direction finder is located and the bearing of the transmitter whose direction is being determined.

5. A radio compass direction finder comprising a rotatable loop antenna, a vertically extending shaft adapted to control the rotation of said loop antenna, a gyro compass repeater rigidly attached to said shaft and rotating therewith, said gyro compass repeater comprising a housing; a repeater motor within said housing, the rotation of the rotor of said motor being controlled by a gyro compass; the vertical axes of said shaft and said gyro compasse repeater housing being in alignment, so that said shaft and said gyro compass repeater housing and mechanism are rotatable on a common axis; a calibrated scale, a fixed index adjacent to said calibrated scale, a second vertical shaft; one end of said second shaft adapted to support and rotate said calibrated scale, the other end of said second shaft fitted into said gyro compass repeater housing and attached to the rotor of said repeater mechanism contained therein; the vertical axis of said second shaft being in alignment with the vertical axis of said first shaft and with the vertical axis of said gyro compass repeater housing and said calibrated scale, so that said first shaft, said gyro compass repeater housing and mechanism, said second shaft and said scale are simultaneously and concentrically rotatable on a common axis, and, in addition to said simultaneous rotation about the common axis, said second shaft and said scale being capable of independent rotation about said common axis by the action of the rotor of said gyro compass repeater mechanism; means to make audible the signals picked up by said loop antenna, the bearing obtained thereby being the algebraic sum in degrees of the simultaneous rotation of said first shaft, said gyro compass repeater housing and mechanism, said second shaft and said calibrated scale, and of the independent rotation of said second shaft and said calibrated scale.

SIMON DI RENZO.